United States Patent [19]

Berger et al.

[11] Patent Number: 4,654,418
[45] Date of Patent: Mar. 31, 1987

[54] CONTINUOUS REMOVAL OF THE CATALYST FROM POLYPHENYLENE ETHERS

[75] Inventors: Rosemarie Berger, Limburgerhof; Hermann Dreher, Seeheim-Jugendheim; Juergen Hambrecht, Heidelberg; Eduard Heil, Limburgerhof; Rudi W. Reffert, Beindersheim; Johann Swoboda; Adolf Echte, both of Ludwigshafen; Peter Siebel, Limburgerhof, all of Fed. Rep. of Germany

[73] Assignee: BASF Aktiengesellschaft, Ludwigshafen, Fed. Rep. of Germany

[21] Appl. No.: 627,984

[22] Filed: Jul. 5, 1984

[30] Foreign Application Priority Data

Jul. 6, 1983 [DE] Fed. Rep. of Germany ....... 3324338

[51] Int. Cl.⁴ .............................................. C08G 65/42
[52] U.S. Cl. ................................... 528/486; 528/492; 528/499
[58] Field of Search ..................... 528/486, 492, 499

[56] References Cited

U.S. PATENT DOCUMENTS

| | | |
|---|---|---|
| 3,306,874 | 2/1967 | Hay ....................................... 260/47 |
| 3,306,875 | 2/1967 | Hay ....................................... 260/47 |
| 3,639,656 | 2/1972 | Bennett ................................. 260/47 |
| 3,642,699 | 2/1972 | Cooper ................................. 260/47 |
| 3,661,848 | 5/1972 | Cooper et al. ....................... 260/47 |
| 3,733,301 | 5/1973 | Modan ................................. 528/486 |
| 4,062,970 | 12/1977 | Shipchandler ....................... 424/279 |
| 4,110,311 | 8/1978 | Cooper et al. ....................... 528/486 |
| 4,116,939 | 9/1978 | Cooper et al. ....................... 528/486 |
| 4,237,265 | 12/1980 | Eliassen et al. ...................... 528/486 |
| 4,460,764 | 7/1984 | Reffert et al. ........................ 528/486 |
| 4,536,567 | 8/1985 | Hambrecht et al. ................. 528/486 |

FOREIGN PATENT DOCUMENTS

| | | |
|---|---|---|
| 2105372 | 9/1971 | Fed. Rep. of Germany . |
| 2364319 | 7/1974 | Fed. Rep. of Germany . |
| 2460325 | 10/1975 | Fed. Rep. of Germany . |
| 2532477 | 5/1976 | Fed. Rep. of Germany . |
| 2640147 | 3/1977 | Fed. Rep. of Germany . |

Primary Examiner—Lucille M. Phynes
Attorney, Agent, or Firm—Keil & Weinkauf

[57] ABSTRACT

The catalyst is removed in the preparation of high molecular weight polyphenylene ethers from monohydric phenols, which are alkyl-substituted at the two ortho-positions but not at the para-position and may or may not be alkyl-substituted at the meta-position, by an oxidative coupling reaction with oxygen at from 15° to 50° C. in the presence of a catalyst complex obtained from a copper salt and an organic amine, in the presence of from 1 to 20 parts by weight of a solvent per part by weight of the monomeric phenol, and in the presence or absence of an activator, and removal of the metal component of the catalyst from the polyphenylene ether solution with a complex-forming or chelate-forming compound in aqueous solution, in the presence or absence of reducing and stabilizing substances and assistants for accelerating the interphase reactions and for phase separation, by a method in which the continuous removal of the copper catalyst is carried out in one or more mixer-settler stages at a phase volume ratio of the organic phase to the aqueous phase of from 1:0.1 to 1:1.0, preferably from 1:0.4 to 1:0.6.

8 Claims, 1 Drawing Figure

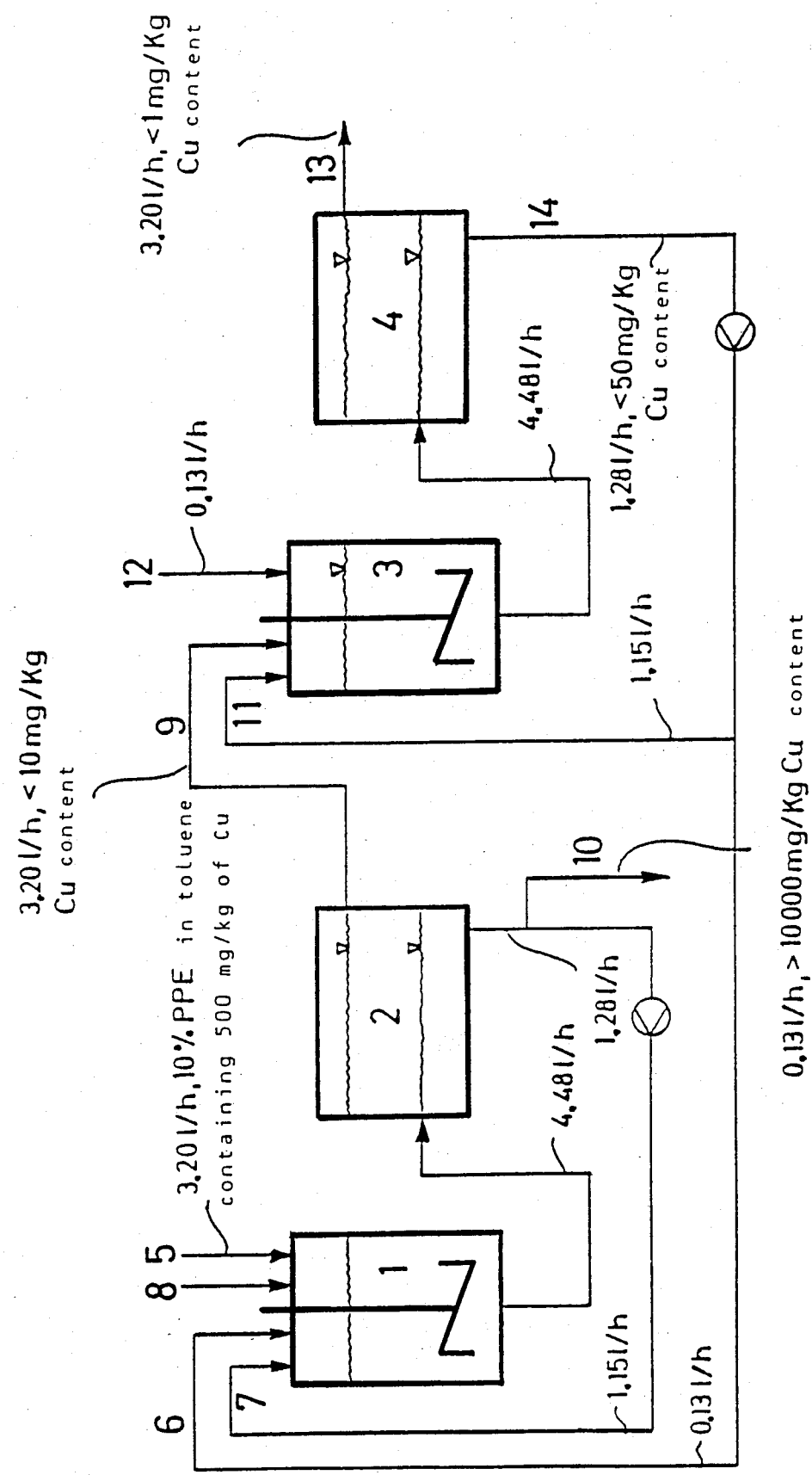

CONTINUOUS REMOVAL OF THE CATALYST FROM POLYPHENYLENE ETHERS

The present invention relates to a continuous process for removing the catalyst in the preparation of a high molecular weight polyphenylene ether from a monohydric phenol, which is alkyl-substituted at the two ortho-positions but not at the para-position and may or may not be alkyl-substituted at the meta-position, by an oxidative coupling reaction with oxygen at from 15° to 50° C. in the presence of a catalyst complex obtained from a copper salt and an organic amine, in the presence of from 1 to 20 parts by weight of a solvent per part by weight of the monomeric phenol, and in the presence or absence of an activator, and removal of the metal component of the catalyst from the polyphenylene ether solution with a complex-forming or chelate-forming compound in aqueous solution, in the presence or absence of reducing and stabilizing substances and assistants for accelerating the interphase reactions and for phase separation, and to an arrangement for carrying out the process.

Polyphenylene ethers and processes for their preparation are well known and have been described in many publications, for example U.S. Pat. Nos. 3,306,874, 3,306,875, 3,639,656, 3,642,699 and 3,661,848.

The processes most frequently used for the preparation of polyphenylene ethers comprise autocondensation of monohydric phenols in the presence of oxygen and of a catalyst.

Preferred catalysts are metal-amine complexes, in particular Cu-amine complexes, and preferred solvents are aromatic hydrocarbons. The reaction is usually terminated by removing the catalyst from the reaction solution. This is done by a countercurrent extraction method, using an aqueous solution of an inorganic or organic acid (cf. German Laid-Open Application DOS. No. 2,105,372). Other compounds used are polycarboxylic acids and/or polyaminocarboxylic acids (cf. German Laid-Open Application DOS No. 2,364,319) or other chelating agents, eg. nitrilotriacetic acid and its sodium salts or ethylenediaminetetraacetic acid and its sodium salts ($Na_3$-EDTA; cf. German Laid-Open Application DOS No. 2,532,477), the latter also in combination with quaternary ammonium salts (cf. U.S. Pat. No. 4,062,970). Removal of the catalyst with the aid of complex-forming agents from the group consisting of the bisguanides has also been described (cf. German Laid-Open Application DOS No. 2,460,325), while German Laid-Open Application DOS No. 2,640,147 describes a continuous process for separating off the catalyst.

Apart from terminating the oxidative autocondensation, the addition of the complex-forming agent is aimed at achieving very substantially complete removal of the metal catalyst from the polyphenylene ether, since contamination of the polymer by residual metal has an adverse effect on the entire spectrum of properties of the polymer. The sensitivity to oxidation and the inherent color are particularly affected.

All conventional measures for removing the residual catalyst have the disadvantage that repeated extraction steps, entailing complicated separation processes in some cases, have to be used in order to achieve complete removal (residual amounts of metal ions less than 20 mg/kg). Frequently, these procedures change the character of the polyphenylene ether.

It is known that, because of the poor phase separation achieved, it is difficult to separate off the catalyst from polyphenylene ethers with the aid of aqueous extracting agents, some of the metal-containing aqueous phase remaining in the organic phase. If the organic solutions are worked up, the copper catalyst residues in the end product present problems.

German Laid-Open Application DOS No. 2,640,147 proposes mixing the polyphenylene ether reaction solution with a small amount of an aqueous solution of a complex-forming substance and then improving the phase separation by admixing an alcohol-containing diluent. Dilution of the aqueous phase results in a lower, more acceptable copper content in the organic solution when the aqueous solution is not completely separated off.

However, this process has the disadvantages that the actual complexing reaction and the dilution to achieve better separation have to be carried out in separate mixing units, and that to achieve separation at the proposed phase volume ratio of aqueous phase to organic phase, ie. from 1:1 to 10:1, a large amount of alcohol is required, which has to be recovered. Furthermore, the copper is obtained in very dilute solution, and this is disadvantageous in the recovery and poison removal steps. Moreover, this process gives polyphenylene ether solutions which still contain unsatisfactorily large amounts of copper.

It is an object of the present invention to provide a simple and highly effective continuous process for removing the residual catalyst from the reaction products formed in the autocondensation of monohydric phenols.

We have found that this object is achieved, in accordance with the invention, by the continuous removal of the copper catalyst in one or more mixer-settler stages at a phase volume ratio of the organic phase to the aqueous phase of from 1:0.2 to 1:0.8, preferably from 1:0.4 to 1:0.6.

The claims also cover further features of the novel process and of the arrangement for carrying out the process.

An example of the invention is shown in the drawing and is described in detail below.

The drawing shows a flow sheet of the novel continuous process for the removal of the copper catalyst from polyphenylene ether reaction solutions, consisting of two mixer-settler stages.

The first mixer-settler stage consists of the mixer 1 and the settler 2, while the second stage comprises the mixer 3 and the settler 4. Copper-containing polyphenylene ether solution 5 from the reaction, an aqueous complexing agent solution 6 having a low copper content, from the settler 4, and an aqueous phase 7 having a high copper content, from the settler 2, flow continuously into the mixer 1 in proportions such that the phase volume ratios according to the invention are established in the steady state. If required, the abovementioned reducing agents, stabilizers and assistants 8 can be introduced into the mixer 1. The mixture discharged from the mixer 1 flows continuously into the settler 2, where phase separation takes place to give the aqueous phase 7 having a high copper content and the organic phase 9. Some of the phase 7, ie. the phase 10, the amount of which corresponds to that of phases 6 and 8, is continuously removed from the cycle and is fed to the recovery stage or for removal of poison. The organic phase 9 from the settler 2 and the aqueous complexing agent solution 11 having a low copper content, from the settler 4, as well as fresh copper-free aqueous complexing agent solution 12 flow into the mixer 3 in proportions such that the phase volume ratios according to the invention are established in the steady state. The mixture discharged from the mixer 3 flows continuously into the settler 4, where phase separation takes place to give a polyphenylene ether solution 13 having a very low copper content and an aqueous complexing agent solution 14 having a low copper content. The major part 11 of the phase 14 is recycled to the mixer 3, while the small amount 6 is recycled to the mixer 1, as stated above. Mass balance gives the following phase volume ratios for the mixers:

$$\frac{\text{Organic phase}}{\text{Aqueous phase}} = \frac{3.20}{0.13 + 1.15} = \frac{1}{0.4}$$

In the first stage, the aqueous phase 10 removed from the settler 2 has a copper content of not less than 1,000, preferably >10,000, mg/kg, and the organic phase removed from the settler 2 has a copper content of <10 mg/kg. In the second stage, the aqueous complexing agent solution 14 removed from the settler 4 has a copper content of <500, preferably <50, mg/kg. The organic solution, which corresponds to the polyphenylene ether solution 13, has a copper content of <1 mg/kg when removed from the settler, and is fed to a working up stage.

In the process according to the invention, the contact or residence times in the mixers are from 2 to 40 minutes, and measurements have shown that residence times of from 10 to 20 minutes are sufficient. The residence times in the settlers are from a few minutes to several hours, although from 5 to 60 minutes are generally sufficient in the case of gravity settlers. The temperatures are in general from 20° to 80° C., preferably from 60° to 75° C., but it is also possible to employ higher temperatures provided that the process is carried out at above the boiling pressure of the water and of the solvents. The process is carried out in general under atmospheric or slightly superatmospheric pressure. The continuous removal, according to the invention, of the copper catalyst from the polyphenylene ether solution can be carried out in several mixer-settler stages, but a preferred embodiment is one in which the total amount of copper catalyst is removed in one or two stages. The arrangement shown in the drawing for carrying out the process is only one of the models possible within the scope of the present invention. For example, various types of apparatuses or machines can be used as mixers and settlers, eg. stirred vessels, various types of pumps, gravity settlers, settling tanks, hydrocyclones, centrifuges, etc., or arrangements which contain the mixer and settler as a single unit. The above description and list of the novel arrangement for carrying out the process are not intended in any way to restrict the procedure mechanically or in terms of apparatus.

The particular advantages obtained with the invention are that the amounts of residual copper catalyst in the polyphenylene ethers can be substantially reduced, and the resulting polyphenylene ethers possess improved color stability and stability to oxidation during processing at above 250° C. Removal of the copper catalyst by the novel process is simple and is generally carried out in a single step. Dilute and relatively highly concentrated polyphenylene oxide reaction solutions having a concentration up to about 25% by weight can be converted without problems. Another advantage is that the aqueous phase containing copper complex can be removed rapidly when the copper content is high; as a result, the recovery of Cu or the disposal is made substantially easier.

As stated above, a preferred aspect of the novel process is the preparation of polyphenylene ether solutions which have a low copper content, and from which the polymeric substances can be obtained by total isolation methods, eg. spray drying, steam precipitation, crumb formation with hot water and multi-stage devolatilization. Such processes, which are more economical than the conventional precipitation methods in terms of the energy required, the solvent losses and the like, can therefore be used in a more economical manner.

We claim:

1. A continuous process for removing the catalyst in the preparation of a high molecular weight polyphenylene ether from a monohydric phenol, which is alkyl-substituted at the two ortho-positions but not at the para-position and may or may not be alkyl-substituted at the meta-position, by an oxidative coupling reaction with oxygen at from 15° to 50° C. in the presence of a catalyst complex obtained from a copper salt and an organic amine, in the presence of from 1 to 20 parts by weight of a solvent per part by weight of the monomeric phenol, and in the presence or absence of an activator, and removal of the metal component of the catalyst from the polyphenylene ether solution with a copper complex-forming or chelate-forming compound in aqueous solution, in the presence or absence of reducing and stabilizing substances and assistants for accelerating the interphase reactions and for phase separation, wherein the continuous removal of the copper catalyst is carried out in one or more mixer-settler stages at a phase volume ratio of the organic phase to the aqueous phase of from 1:0.1 to 1:1.0.

2. A process as claimed in claim 1, wherein the continuous removal of the copper catalyst is carried out in two mixer-settler stages at, in each case, a phase volume ratio of the organic phase to the aqueous phase of from 1:0.2 to 1:0.8.

3. A process as claimed in claim 1, wherein, in the first stage, the aqueous phase removed from the settler has a copper content of not less than 1,000, and the organic phase removed from the settler has a copper content of less than 10 mg/kg.

4. A process as claimed in claim 1, wherein, in the second stage, the aqueous phase removed from the settler has a copper content of less than 500, and the organic phase removed from the settler has a copper content of less than 1 mg/kg, and some of the aqueous phase is fed, as complexing agent solution, to the mixer of the first stage, and, in order to maintain the phase volume ratio, is replaced by aqueous complexing agent solution having a low copper content.

5. The process of claim 1 wherein the phase volume ratio of the organic phase to the aqueous phase is from 1:0.4 to 1:0.6.

6. The process of claim 2 wherein the phase volume ratio of the organic phase to the aqueous phase is from 1:0.4 to 1:0.6.

7. The process of claim 3 wherein in the first stage, the aqueous phase removed from the settler has a copper content of more than 10,000, mg/kg.

8. The process of claim 4 wherein in the second stage, the aqueous phase removed from the settler has a copper content less than 50, mg/kg.

* * * * *